US007817301B2

(12) United States Patent
Ohno et al.

(10) Patent No.: US 7,817,301 B2
(45) Date of Patent: Oct. 19, 2010

(54) DATA RECEIVING-PROCESSING APPARATUS

(75) Inventors: Tomoyuki Ohno, Kanagawa (JP); Shuntaro Aratani, Tokyo (JP); Katsuhiro Miyamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1119 days.

(21) Appl. No.: 10/944,735

(22) Filed: Sep. 21, 2004

(65) Prior Publication Data
US 2005/0091700 A1 Apr. 28, 2005

(30) Foreign Application Priority Data
Oct. 22, 2003 (JP) ............................. 2003-361746

(51) Int. Cl.
G06K 15/00 (2006.01)
G06F 3/00 (2006.01)
H04N 5/04 (2006.01)
(52) U.S. Cl. ......................... 358/1.18; 725/37; 725/40; 725/41; 725/42; 725/43; 348/552
(58) Field of Classification Search ................ 358/1.18; 725/133, 139; 348/552
See application file for complete search history.

(56) References Cited
U.S. PATENT DOCUMENTS

| 5,907,323 | A  | * | 5/1999 | Lawler et al. ................. 725/41 |
| 6,359,701 | B1 | * | 3/2002 | Yamada et al. ................ 358/1.2 |
| 7,373,650 | B1 | * | 5/2008 | Rodriguez et al. ............ 725/41 |
| 7,385,719 | B2 |   | 6/2008 | Ohno et al. ................. 358/1.15 |
| 7,443,418 | B2 | * | 10/2008 | Bryant et al. ............ 348/207.1 |
| 2002/0016964 | A1 |   | 2/2002 | Aratani et al. |
| 2002/0019982 | A1 |   | 2/2002 | Aratani et al. |
| 2002/0049794 | A1 |   | 4/2002 | Hara |
| 2002/0060748 | A1 |   | 5/2002 | Aratani et al. |
| 2002/0062487 | A1 | * | 5/2002 | Ohno et al. ................. 725/133 |
| 2002/0063797 | A1 |   | 5/2002 | Aratani et al. |
| 2002/0073424 | A1 | * | 6/2002 | Ward et al. ................... 725/42 |
| 2002/0089610 | A1 | * | 7/2002 | Ohno et al. ................. 348/734 |
| 2002/0171872 | A1 |   | 11/2002 | Matsunaga |
| 2003/0142236 | A1 |   | 7/2003 | Aratani et al. |
| 2003/0208778 | A1 |   | 11/2003 | Aratani et al. |
| 2004/0032621 | A1 | * | 2/2004 | Suzuki et al. ............. 358/1.18 |
| 2004/0117830 | A1 |   | 6/2004 | Ohno et al. |
| 2004/0261136 | A1 |   | 12/2004 | Aratani et al. |

(Continued)

FOREIGN PATENT DOCUMENTS
JP          11-234228          8/1999

(Continued)

Primary Examiner—Mark K Zimmerman
Assistant Examiner—Huo Long Chen
(74) Attorney, Agent, or Firm—Fitzpatrick, Cella, Harper & Scinto

(57) ABSTRACT

Information relating to print contents is presented to the user in an easily understandable manner. A demultiplexer separates picture data, speech data and other data from received data. Such data include EPG data, data broadcast data, print contents data and supplementary information on the print contents data. A data stream process unit decodes the supplementary information on the print contents data and the print contents data. An image construction unit constructs an image signal of an image frame, providing a list display of transmission schedule and supplementary information of the print contents. The image signal is supplied through a display controller to an image display unit and displayed as an image.

4 Claims, 14 Drawing Sheets

U.S. PATENT DOCUMENTS

2005/0151881 A1* 7/2005 Yamaguchi et al. ......... 348/552

FOREIGN PATENT DOCUMENTS

| JP | 2001-285815 | | 10/2001 |
| JP | 2001320637 A | * | 11/2001 |
| JP | 2002-158976 | | 5/2002 |
| JP | 2002-158979 | | 5/2002 |
| JP | 2002-190782 | | 7/2002 |
| JP | 2002-190784 | | 7/2002 |
| JP | 2002-190988 | | 7/2002 |
| JP | 2002-191013 | | 7/2002 |
| JP | 2002-262245 | | 9/2002 |
| JP | 2003-37812 | | 2/2003 |
| JP | 2003-264803 | | 9/2003 |
| WO | WO 03/071795 A1 | | 8/2003 |

* cited by examiner

FIG. 5

PCG

IT IS POSSIBLE TO CARRY OUT PRINT AND RESERVATION FOR PRINT USING COLOR BUTTONS AND NUMBER KEYS — 511

PRINTER A — 504

THERE IS NO ERROR IN PRINTER. PRINT IS ABLE. ESTIMATED PRINT TIME: 20 MINUTES

PRINT CONTENTS C — 505

THERE ARE FULL OF PHOTOGRAPH DATA OF SPORT PLAYERS AND IDOLS. — 506

PRINT ABLE TIME 19:00-21:00  CHARGED FOR PRINT  ¥500 — 508

PAPER SIZE : A4   TYPE OF DATA : PHOTOGRAPH  — 507
NUMBER OF PRINT SHEETS : 15   RECORD IS UNABLE — 509

| 501 | 100 | 101 | 102 | 103 |
|---|---|---|---|---|
| 19:00 | THERE IS NO PRINTABLE DATA | ✽ PRINT CONTENTS C (RED)1 — 510 | THERE IS NO PRINTABLE DATA | PRINT CONTENTS K  YELLOW 2 |
| 20:00 | ✽ PRINT CONTENTS A  BLUE 1 — 503 | PRINT CONTENTS D (RED)2 | ✽ PRINT CONTENTS E (GREEN)1  PRINT CONTENTS F (GREEN)2  ✽ PRINT CONTENTS G (GREEN)3  PRINT CONTENTS H (GREEN)4 | THERE IS NO PRINTABLE DATA |
| 21:00 | ✽ PRINT CONTENTS B  BLUE 2 | THERE IS NO PRINTABLE DATA | PRINT CONTENTS I (GREEN)5 | ✽ PRINT CONTENTS L  YELLOW 1 |
| 22:00 | | | PRINT CONTENTS J (GREEN)6 | |

| | 100 | 101 | 102 | 103 |
|---|---|---|---|---|
| 19:00 | THERE IS NO PRINTABLE DATA | ✱ PRINT CONTENTS C (RED) 1 | THERE IS NO PRINTABLE DATA | PRINT CONTENTS K YELLOW 2 |
| 20:00 | ✱ PRINT CONTENTS A (BLUE) 1 | PRINT CONTENTS D (RED) 2 | ✱ PRINT CONTENTS E (GREEN) 1 / PRINT CONTENTS F (GREEN) 2 / ✱ PRINT CONTENTS G (GREEN) 3 / PRINT CONTENTS H (GREEN) 4 | THERE IS NO PRINTABLE DATA |
| 21:00 | ✱ PRINT CONTENTS B (BLUE) 2 | THERE IS NO PRINTABLE DATA | PRINT CONTENTS I (GREEN) 5 | |
| 22:00 | | | PRINT CONTENTS J (GREEN) 6 | ✱ PRINT CONTENTS L YELLOW 1 |

PCG: IT IS POSSIBLE TO CARRY OUT PRINT AND RESERVATION FOR PRINT USING COLOR BUTTONS AND NUMBER KEYS

PRINTER A — 504
THERE IS NO ERROR IN PRINTER.
PRINT IS ABLE.
ESTIMATED PRINT TIME: 20 MINUTES

PRINT CONTENTS F
PHOTO CONTENTS OF AMERICAN MOTHER NATURE.
PRINT ABLE TIME 20:00-20:20    NO CHARGE FOR PRINT
PAPER SIZE : A4    TYPE OF DATA : PHOTOGRAPH
NUMBER OF PRINT SHEETS : 5    RECORD IS ENABLE — 909

503

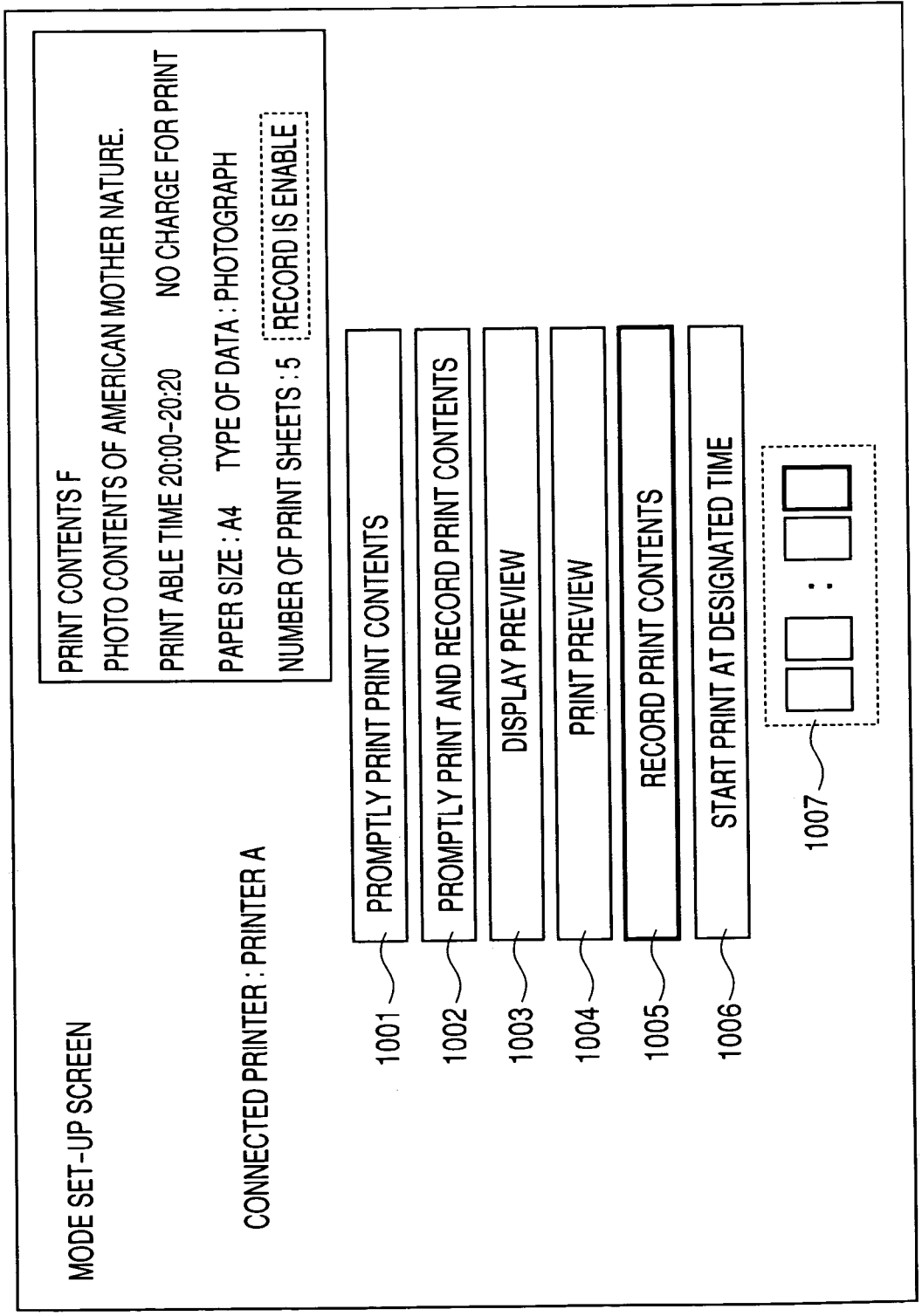

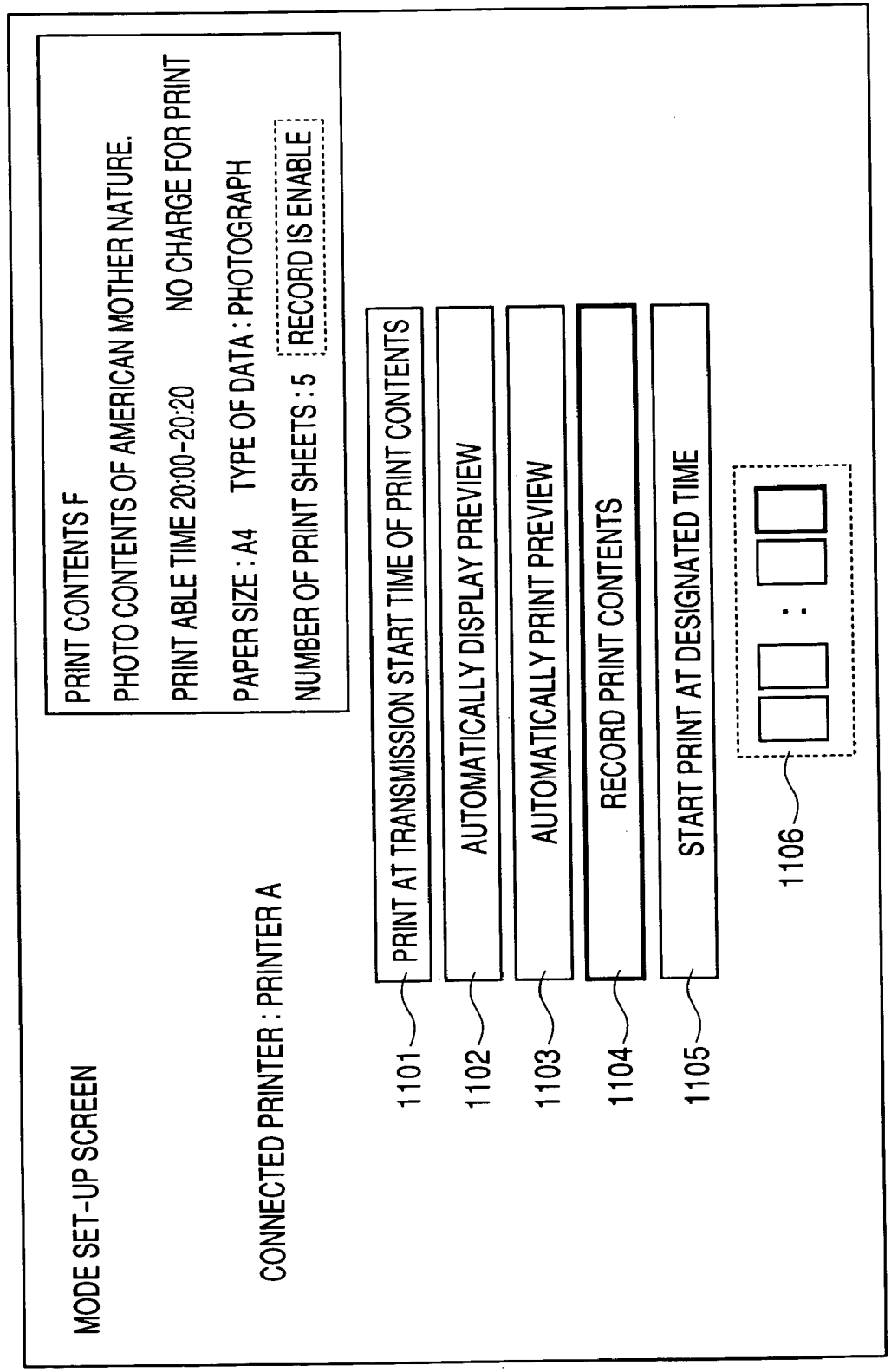

FIG. 12

| | |
|---|---|
| 1201 | PARAMETER DESCRIPTION FIELD 1 OF PRINT CONTENTS<br>• ID OF PRINT CONTENTS<br>• TRANSMISSION START TIME OF PRINT CONTENTS<br>• TRANSMISSION CONTINUITY TIME OF PRINT CONTENTS<br>• FLAG OF CHARGED/FREE |
| 1202 | PARAMETER DESCRIPTION FIELD 2 OF PRINT CONTENTS<br>• SIZES OF DOCUMENTS (e.g., A4, A3)<br>• TYPES OF DOCUMENTS (e.g., PHOTOGRAPH, TEXT, DIAGRAM)<br>• NUMBER OF DOCUMENT SHEETS<br>• DATA CAPACITY OF DOCUMENTS<br>• FLAG OF ABLE/UNABLE OF RECORD |
| 1203 | PARAMETER DESCRIPTION FIELD 3 OF PRINT CONTENTS<br>• FEE IN CASE OF CHARGED CONTENTS |
| 1204 | PARAMETER DESCRIPTION FIELD 4 OF PRINT CONTENTS<br>• TITLE OF PRINT CONTENTS |
| 1205 | PARAMETER DESCRIPTION FIELD 5 OF PRINT CONTENTS<br>• SUBSTANCE OF PRINT CONTENTS |

FIG. 13

| EPG | | | | |
|---|---|---|---|---|
| 1301 | 100 1302 | 101 | 102 | 103 |
| | MUSIC 1 ⟵1303 | SPORT A | ANIMATION 1 | MOVIE 1 |
| 19:00 | | | | |
| | MUSIC 2 | | ANIMATION 2 | |
| 20:00 (✱) | (✱) | (✱) | | |
| | MUSIC 3 | SPORT B  1305 | ANIMATION 3 | MOVIE 2 |
| 21:00 (✱) | | | | |
| | | SPORT C | ANIMATION 4 | |
| 22:00 | | | ANIMATION 5 | MOVIE 3 |
| | | | ANIMATION 6 | (✱) |

THERE ARE PRINT DATA

1304
SPORT A
THIS IS PROGRAM FOR INTRODUCING FASCINATIONS OF VARIOUS SPORTS
BROADCAST TIME 19:00–21:00   AUDIENCE FEE ¥500
1306⟶(P)

DATA RECEIVING-PROCESSING APPARATUS

BACKGROUND OF THE INVENTION

1. Field of the Invention

The present invention relates to a data processing apparatus and a system in a television broadcasting receiver which supports data broadcasting reception for receiving data broadcast contents multiplexing, for example, a character, an image, a speech, a picture and the like and executing display and reproduction.

2. Related Background Art

Data broadcasting is now operated in the ground wave television broadcasting, and is going to be operated also in the satellite digital broadcasting. Such data broadcasting is broadcast from a broadcasting station by superposing data with a broadcasting wave. A receiving terminal fetches the received and accumulated data into a personal computer or an exclusive terminal, and a display is given by a general WWW (world wide web) browser software or an exclusive browser software.

Recently, new services are anticipated by rendering such data broadcasting receivable not only in a personal computer but also in a television receiver. By providing the television receiver itself with a data broadcast receiving function and a browser software, even a user not having a personal computer can easily view the information of the data broadcasting, thereby enjoying a service of displaying information relating to the television program by characters and image.

As an example, a novel news service utilizing the data broadcasting is proposed. In such service, a picture of a news is recorded in advance in an accumulating apparatus of a television receiver, then a data broadcasting image composed of characters and image is presented as "a news item" to the user, and a picture of a news item selected by the user, for example by a remote control, is reproduced. Such service allows the user to observe, at any time, a news program that has been available only at predetermined times, and allows the user to observe the desired news items only. In this manner, novel services that have not existed become available. Reference is to be made, for example, to Japanese Patent Application Laid-open No. 2001-285815 (US AA2002016964).

In case the television receiver is given a receiving function for such data broadcasting, a font of a somewhat larger size is usually employed for improving the legibility of characters. As a result, an amount of character information that can be displayed at a time is naturally reduced. For example, in a news service, only three to five news contents can be displayed at maximum on an image area, and it is difficult to display many news items in summary and with photographs.

It is possible to display the information that cannot be displayed at one time by scrolling or by page switching, but this requires the user to execute an unnecessary operation. Such operation cannot be considered adequate, in consideration of the user who is not accustomed with an operation environment of a personal computer or a video game machine.

Also the convenience to the user can be improved by printing useful contents of the broadcasted picture program or the data broadcasting on a paper for reviewing afterwards. In such case, it is conceivable to connect a video printer to the television receiver and to capture and print an image displayed on the television receiver. However, since a larger font is usually used for increasing the legibility of the characters, the printed characters become inevitably large. In such case, it is not possible to exploit the advantage of paper that generally has a higher character legibility than in a television image.

Data printing of data broadcasting is described in patent references 1 to 7. Also a technology including print data in the data broadcasting is described in patent reference 8.

(Patent reference 1) Japanese Patent Application Laid-open No. 2003-037812 (US AA2002171872)

(Patent reference 2) Japanese Patent Application Laid-open No. 2002-262245 (US AA2002016964)

(Patent reference 3) Japanese Patent Application Laid-open No. 2002-191013

(Patent reference 4) Japanese Patent Application Laid-open No. 2002-190988

(Patent reference 5) Japanese Patent Application Laid-open No. 2002-190784

(Patent reference 6) Japanese Patent Application Laid-open No. 2002-190782

(Patent reference 7) Japanese Patent Application Laid-open No. 2002-158979 (US AA2002060748)

(Patent reference 8) Japanese Patent Application Laid-open No. H11-234228

In order to resolve such drawbacks, it is also conceivable to broadcast, together with the data of picture-speech program or the data of data broadcasting, printable data such as more detailed character data and image data as a transport stream (TS) and to use such data for printing with a printer as a peripheral equipment. In such case, following drawbacks are encountered.

Firstly, it is difficult for the user to judge when the printing data are transmitted and until when the data is printable. Secondly, it is difficult for the user to judge the contents of the transmitted printing data. Thirdly, it is difficult for the user to understand the type of the transmitted printing data. Fourthly, it is difficult for the user to estimate the volume of printing. Fifthly, it is difficult for the user to judge whether the printing is charged or not. Sixthly, it is difficult for the user to judge the printing time required by the printer connected to the receiver. Seventhly, it is difficult for the user to judge whether the transmitted data can be accumulated. Eighthly, it is difficult for the user to judge, in case the printing data are related with a picture-speech program or a data broadcasting, the picture-speech program or the data broadcasting to which the printing data are related.

In consideration of the foregoing, the present invention is to provide a data receiving-processing apparatus capable of a list display of contents data that can be outputted to a peripheral equipment. The peripheral equipment may be separated from the television receiver or may be integrally incorporated therein.

SUMMARY OF THE INVENTION

In a first aspect, the present invention provides a data receiving-processing apparatus including data reception means which receives a data train containing printable contents data and supplementary information data relating to such printable contents data, data extraction means which extracts predetermined data from the data train received by the data reception means, print data output means which outputs the printable contents data, extracted by the data extraction means, in accordance with the supplementary information, and data accumulation means which accumulates the printable contents data, extracted by the data extraction means, in accordance with the supplementary information, wherein the apparatus further includes display means which executes a list display of the contents of at least one of the supplementary information data.

The data receiving-processing apparatus of the present invention further includes data printing means which prints the data from the print data output means, and operation status information receiving means which receives operation status information from the data printing means, wherein the display means executes a list display of the contents of at least one of the supplementary information data together with the operation status information of the data printing means.

The supplementary information of the printable contents data is at least one selected from information on a scheduled time when the printable contents data are contained in the data train, information on an output size relating to the contents of the printable contents data, information on an output page number of the printable contents data, information indicating whether or not the printable contents data are accumulable or not, and information on charging for the printable contents data.

The data receiving-processing apparatus of the present invention so functions as to switch a destination of the printable contents data either to the print data output means or to the data accumulation means, in accordance with a combination of the information on the scheduled time, the information indicating whether the printable contents data are accumulable or not, and current time information.

Preferably in the data receiving-processing apparatus of the present invention, the printable contents data are image information and the supplementary information of the printable contents data is an image having a lower resolution than in the image information.

In a second aspect of the present invention, a data receiving-processing apparatus includes data reception means which receives a data train containing audio-visual contents data, supplementary information relating to the audio-visual contents data, printable contents data relating to the audio-visual contents data, and supplementary information data relating to such printable contents data, data extraction means which extracts predetermined data from the data train received by the data reception means, audio-visual output means which outputs the audio-visual contents data, extracted by the data extraction means, in accordance with the supplementary information, print data output means which outputs the printable contents data, extracted by the data extraction means, in accordance with the supplementary information, and data accumulation means which accumulates the printable contents data, extracted by the data extraction means, in accordance with the supplementary information, wherein the apparatus further includes display means which executes a list display of content of the supplementary information data relating to at least one of the printable contents data, and the contents of the supplementary information data relating to at least one of the audio-visual contents data, in an identifiable form.

The data receiving-processing apparatus according to the second aspect of the invention further includes data printing means which receives and prints the data from the print data output means, and operation status information receiving means which receives operation status information from the data printing means, wherein the display means is provided with means which executes a list display of the contents of the supplementary information data relating to at least one of the printable contents data, the content of the supplementary information data relating to at least one of the audio-visual contents data and the operation status information of the data printing means.

In a third aspect of the present invention, there is provided a display method of receiving contents data which relate to plural audio-visual contents data and which can be outputted to a peripheral equipment and executing a list display of the contents of such contents data which can be outputted to the peripheral equipment. In such display method, the contents data which can be outputted to the peripheral equipment are printing contents data, music contents data or a game program, and the peripheral equipment is a printer, a music reproducing apparatus or a memory apparatus for reproduction. Also in the display method of the present invention, the list display is associated with display of both channel information and time information.

The present invention can also be realized as a computer program for executing such display method. In such case, the present invention provides a computer program for executing a display method of receiving contents data which relate to plural audio-visual contents data and which can be outputted to a peripheral equipment and executing a list display of the contents of such contents data which can be outputted to the peripheral equipment.

According to the present invention, in case of printing data, the user can easily understand when the printing data are transmitted and until when the printing data can be printed. Also the user can easily understand the content of the transmitted printing data. The user can easily understand the type of the transmitted printing data. In case of printing, the user can easily understand the volume of printing. In case of printing, the user can easily understand whether the printing is charged or not. In case of printing, the user can easily understand the time of printing by the printer connected to the receiver. Also the user can easily understand whether the transmitted data are accumulable. In case of printing contents relating to a picture-speech program or a data broadcasting, the user can easily understand the program to which such contents are related.

BRIEF DESCRIPTION OF THE DRAWINGS

FIG. 5 is a view showing an example of an image of a list display of a transmission schedule of printing contents and supplementary information;

FIG. 9 is a view showing another example of a list display of a transmission schedule of printing contents and supplementary information;

FIG. 10 is a view showing an example of a mode setting image;

FIG. 11 is a view showing another example of a mode setting image;

FIG. 12 is a view showing an example of description of a descriptor for supplementary information on printing contents in a second embodiment;

FIG. 13 is a view showing an example of an EPG image showing a transmission schedule of printing contents and supplementary information.

DESCRIPTION OF THE PREFERRED EMBODIMENTS

In the following, embodiments of the present invention will be explained in detail with reference to accompanying drawings.

Embodiment 1

Figure 1:
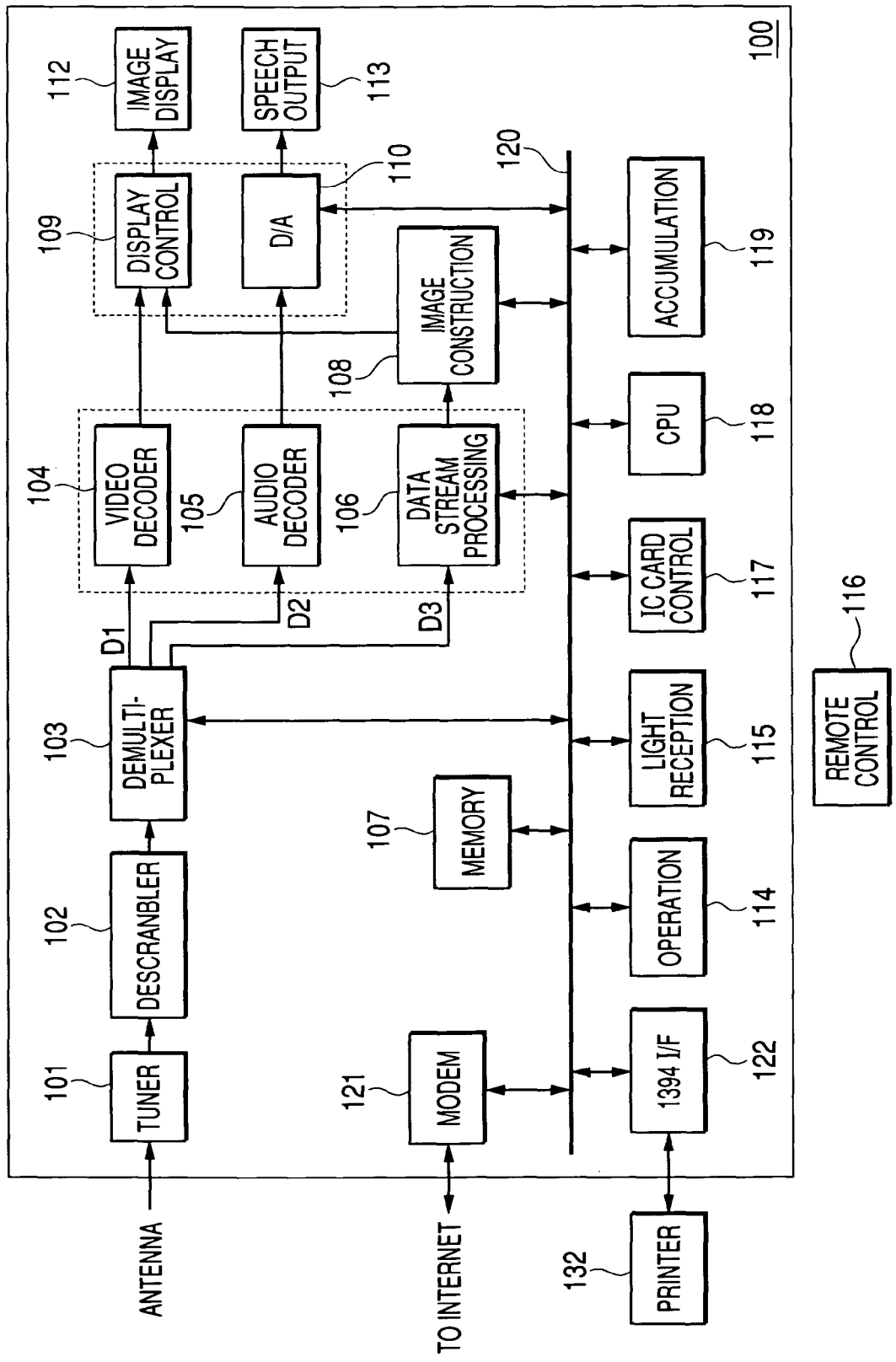
FIG. 1 is a schematic block diagram of a digital television receiver constituting an embodiment of the present invention.

FIG. 1 is a schematic block diagram of a digital television receiver 100 constituting a first embodiment of the present invention.

A signal received by an unillustrated antenna is entered into a tuner 101. The tuner 101 demodulates the entered signal, and executes a process such as error correction to generate a digital data in a format called transport stream. The generated transport stream (TS) data are inputted into a descrambler 102.

In case the TS data, scrambled for audio-visual restriction, are entered from the tuner 101, the descrambler 102 executes a descrambling based on descrambling key information generated in an IC card controller 117, and outputs the data to a demultiplexer 103. The IC card controller 117 has an IC card containing contract information of a user and key information for descrambling key information contained in the TS data. Also in case the non-scrambled TS data are entered from the tuner 101, the descrambler 102 outputs such data, without change, to the demultiplexer 103.

In the TS data outputted from the descrambler 102, picture data and speech data of plural channels, electronic program guide (EPG) data, data of data broadcasting, printing contents data, supplementary information data relating thereto, etc., are time-sharing multiplexed.

The demultiplexer 103 separates, from the TS data outputted from the descrambler 102, picture data D1 and speech data D2 of a channel selected by an operation unit 114 or a remote control 116, and data D3 constituted of electronic program guide (EPG) data, data of data broadcasting, printing contents data, and supplementary information data relating thereto.

Figure 2:
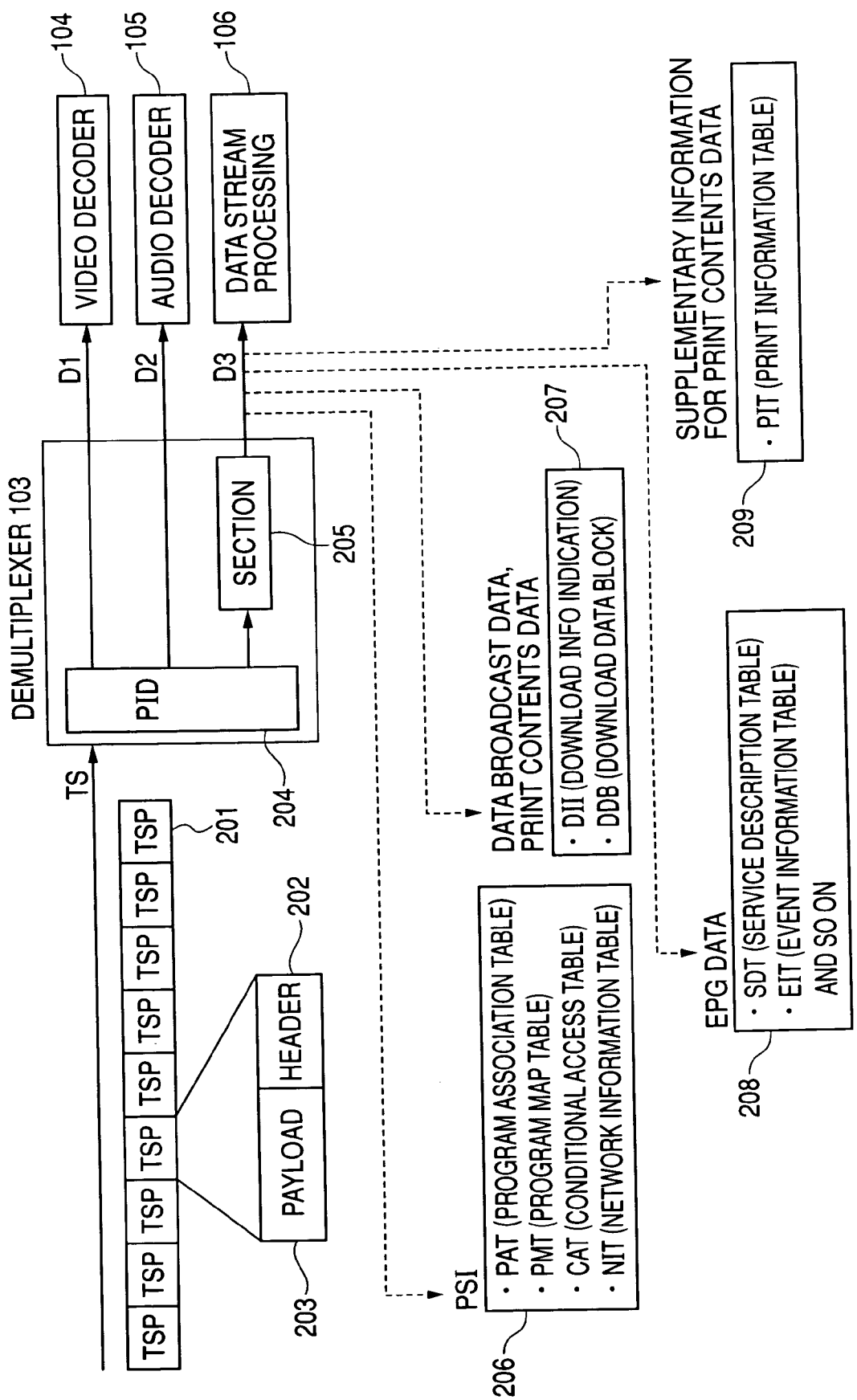
FIG. 2 is a view showing functions of a demultiplexer 103.

FIG. 2 is a view showing the function of the demultiplexer 103 for separating the picture data D1, the speech data D2, and the data D3 constituted of electronic program guide (EPG) data, data of data broadcasting, printing contents data, and supplementary information data relating thereto.

201 indicates TS data in which picture and speech data of plural channels, EPG data, data broadcasting data, printing contents data, and supplementary information data relating thereto are time-sharing multiplexed. The TS data 201 are transmitted in the unit of a packet represented by TSP in FIG. 2, and, in a header 202 of the TS packet TSP, a packet identifier PID is provided.

The demultiplexer 103, utilizing a PID filter 204 and a section filter 205, extracts PSI (program specific information) information 206 in a payload 203 of a specified TS packet and sends it to a data stream process unit 106. The PSI information defines the content of the entire TS data. Utilizing such information, the demultiplexer 103 extracts the picture data D1 and the speech data D2 of the designated channel, and sends them respectively to a video decoder 104 and an audio decoder 105. The demultiplexer 103 sends, by a similar process, the data broadcast data and the print contents data to the data stream process unit 106.

The demultiplexer 103, utilizing a PID filter 204 and a section filter 205, further extracts EPG data 208 and supplementary information 209 on the printing contents in the payload 203 of the specified TS packet and sends them to the data stream process unit 106.

Processing on the picture data D1 will be explained. The video decoder 104 executes an MPEG2 decoding on the picture data D1 entered from the demultiplexer 103, and outputs the decoded picture data on a display controller 109. The display controller 109 causes an image display 112 to display the output image of the video decoder 104, under switching of an image or superposing of another image and/or characters in response to an operation of the video decoder 104 or the remote control 115. An image construction unit 108 will be explained later. The image display 112 is provided with an image monitor and a picture signal input terminal.

Processing on the speech data D2 will be explained. The audio decoder 105 executes an MPEG2 decoding on the speech data D2 entered from the demultiplexer 103, and outputs the decoded speech data to a speech controller 110. The speech controller 110 converts the speech data entered from the audio decoder 105 into an analog signal and outputs it to a speech output unit 113, which is provided with a speaker and a speech signal input terminal.

In the following there will be explained processing on the data D3 constituted of the electronic program guide (EPG) data, the data broadcasting data, the printing contents data, and the supplementary information data relating thereto.

The EPG data are transmitted, for example, in a data structure defined by a standard "program arrangement information to be used for digital broadcasting" of Association for Regulation for Information Broadcasting (ARIB). It principally includes a TDT (time description table) or a TOT (time offset table) transmitting current time information, an SDT (service description table) transmitting information on a channel such as a name of the channel and a title of a broadcasting industry, and an EIT (even information table) transmitting program information on a title of the program, a date and time of start of broadcasting, and an explanation on the content. The TDT or TOT information is also used for a time display on the receiver 100 and a time management for program reservation.

The data broadcast data are transmitted in repetition from the broadcasting station, by a DSM-CC data carousel method defined in ISO/IEC 13818-6 and ARIB technical data "Regulation for operation of BS digital broadcasting". The data broadcast data separated by the demultiplexer 103 are constituted of text information, script information, image information and picture/speech data, and are described by XML (extensible markup language) defined in W3C.

The data stream process unit 106 decodes the text information and the image information contained in the EPG data, also decodes the text information, the image information and the picture/speech data contained in the data broadcast data, and enters the obtained data into a memory 107 through a bus 120. A CPU 118, after a process to be explained later on the data broadcast data, stores data, obtained by such process and including display XML data, in the memory 107.

The CPU 118 reads the EPG display data and the XML display data from the memory 107 according to a data broadcast displaying instruction from the operation unit 114 or from the remote control 116 through a light receiving portion 115, and outputs them to an image constructing portion 108.

The image constructing unit 108 outputs, to a display controller 109, a picture signal based on the EPG display data and the XML display data process and outputted by the CPU 118. The display controller 109 outputs a picture signal corresponding to the switching and synthesized display of a picture frame, an EPG display frame and a data broadcast frame to the image display 112.

The bus 120 is further connected to an IEEE1394 interface (I/F) 122 and a modem 122. The IEEE1394 interface (I/F) 122 is used for a protocol communication and data exchange with a printer 132 connected to the receiver 100. The modem 121 is used for an internet connection through an unillustrated telephone line.

Figure 3:
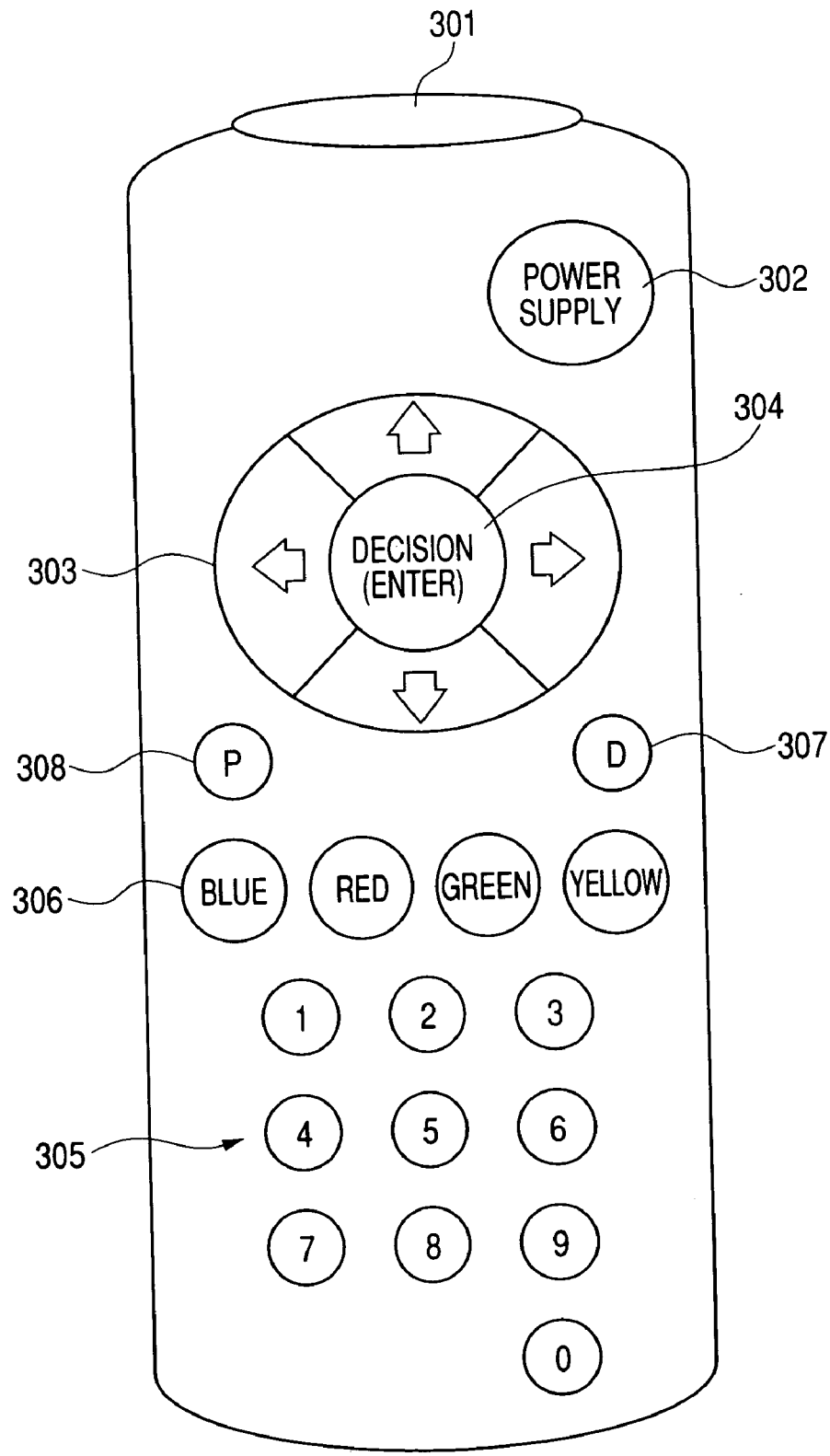
FIG. 3 is a plan view of a remote control 116.

FIG. 3 is a plan view of the remote control 116. However, FIG. 3 principally illustrates operation buttons required for realizing functions of the present embodiment, and buttons required in the actual receiver are omitted. In place for a remote control 116 shown in FIG. 3, it is also possible to utilized a pointing device such as a mouse.

There are shown a light emitting portion 301 for outputting an infrared signal to a light receiving portion 115, a power supply button 302 for turning on/off the power supply of the receiver 100, cursor keys 303 for vertically and horizontally moving a selection cursor, a decision button (enter button) 304 for instruction the selection of an area designated by the selection cursor, and a D button 307 for designating a display of a data broadcast image. Four buttons 306, called color keys, are constituted of "blue", "red", "green" and "yellow" buttons from left to right. Ten keys 305 are used for entering a channel number or a numeral. A P-button 308 will be explained later.

In the following, print contents data will be explained. For the transmission of the print contents data, there can be utilized, for example, a table, a descriptor, and parameters described in ISO/IEC 13818, PSI (program specific information) in ARIB technical data or DSM-CC. The print contents data may also be transmitted in another method.

The print contents data separated by the demultiplexer 103 are constituted of text information, script information and image information, and described in XML (extensible markup language) defined in W3C.

Figure 4:
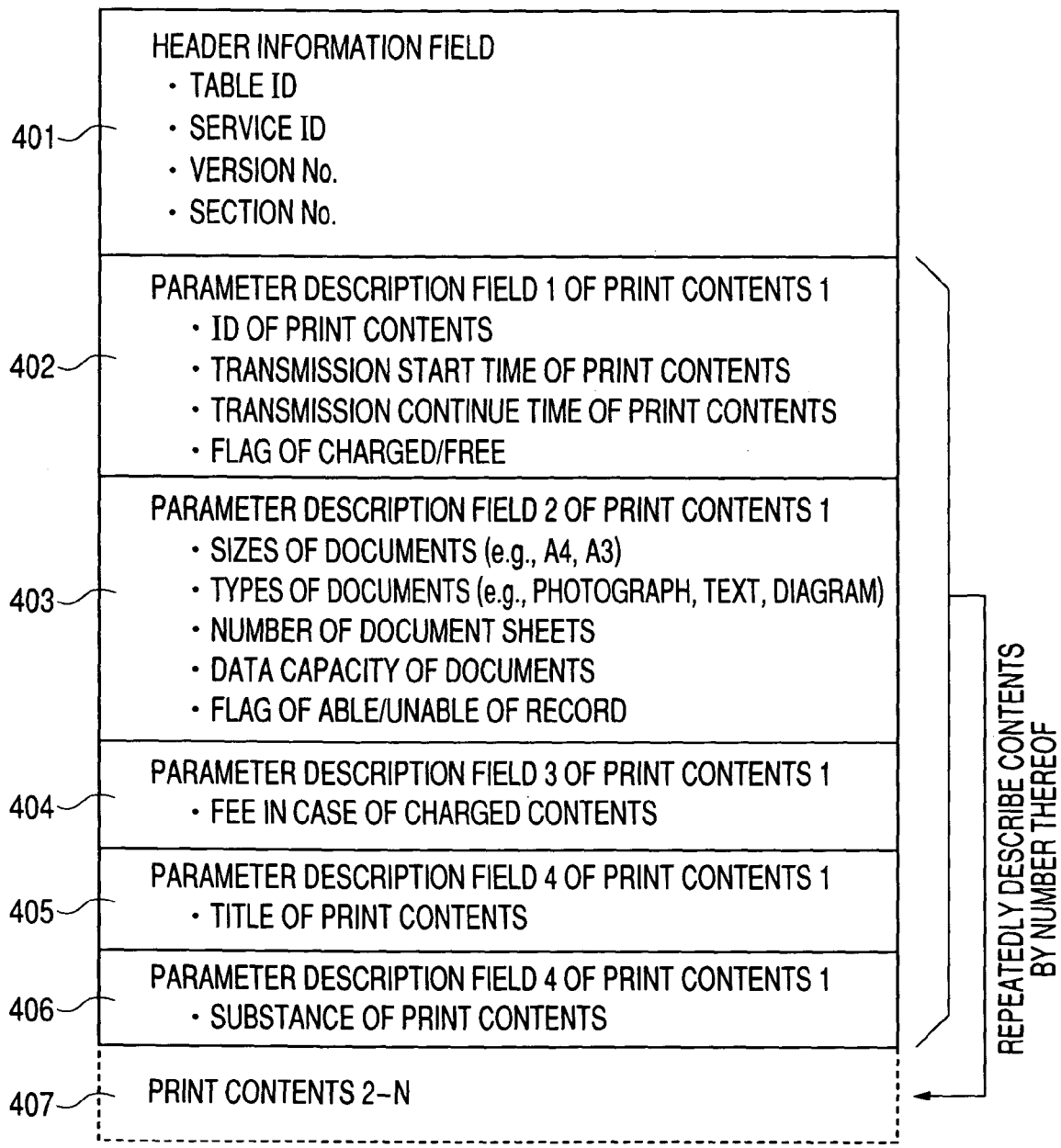
FIG. 4 is a view showing an example of a content of a table describing supplementary information for printing contents.

There will be given an explanation on the supplementary information on the print contents. FIG. 4 shows an example of the description of a table PIT (print information table) describing the supplementary information on the print contents. FIG. 4 shows a case wherein N print contents are present within a table.

A header information field 401 describes parameter information necessary for extracting the PIT in the demultiplexer 103, and principally includes Table_ID, Section_Number, and Service_ID, which have the same meanings as in the aforementioned EIT. The Table_ID and the Section_Number allow to identifying a time width in which the print contents are transmitted. The Service_ID allows identifying a table describing information of a channel for which print information is transmitted.

A parameter description field 402 of print contents 1 describes an ID value given to each print contents, a transmission start time of the print contents 1, a transmission continuation time of the print contents 1, and a flag indicating whether the print contents 1 are charged or not.

A parameter description field 403 of the print contents 1 describes information indicating an optimum sheet size (for example A3 or A4) for printing the print contents 1, information indicating information contained in the print contents 1 (for example, a photograph, a text and a pattern), a number of sheets in case of printing the print contents 1, a data capacity of the print contents 1, and a flag indicating whether or not the print contents 1 may be recorded in a recording medium in addition to a printing.

A parameter description field 404 of the print contents 1 describes a charge, in case the information in the field 403 indicates that the contents are charged.

A parameter description field 405 of the print contents 1 describes text information representing a title of the print contents 1.

A parameter description field 406 of the print contents 1 describes text information describing the content of the print contents 1.

A field 407 contains descriptions similar to those in the fields 402 to 406 on other print contents, in repetition by a number of such print contents. In case there are N print contents, the field 407 describes the information of (N-1) print contents.

The PIT shown in FIG. 4 is given a time zone in which the print contents are transmitted, a Table_ID, a Section_Number and a Service_ID corresponding to the channel and are multiplexed as plural table information with the TS data for transmission. The PIT is separated by the demultiplexer 103, decoded by the data stream process unit 106 and stored in the memory 107 through the bus 120.

In response to a predetermined instruction from the operation unit 114 or the remote control 116 through the light receiving portion 115, or in case the P-button 308 in FIG. 3 is depressed in the present embodiment, the CPU 118 reads the decoded PIT information from the memory 107 and outputs it to the image construction unit 108. The image construction unit 108 constructs a PCG (printable contents guide) image for a list display of transmission schedule of the print contents and supplementary information. Such PCG image is displayed by the display controller 109 and the image display-112. FIG. 5 shows an example of the PCG image.

Referring to FIG. 5, 501 indicates time information on a data transmission schedule. 502 indicates a data transmission channel number. 503 indicates a selection cursor, which can be moved by the cursor keys 303 of the remote control 116 shown in FIG. 3. 504 is an area for displaying supplementary information on the print contents in the area selected by the selection cursor 503. 505 indicates a title of the print contents in the area selected by the selection cursor 503, and corresponds to the text information described in the field 405 in FIG. 4. 506 shows the content of the print contents in the area selected by the selection cursor 503, and corresponds to the text information described in the field 406 in FIG. 4. 507 indicates a printable time of the print contents in the area selected by the selection cursor 503 and whether such printing is charged or not, and corresponds to the information described in the field 402 in FIG. 4.

508 indicates a charge in case of printing, and corresponds to the information described in the field 404 in FIG. 4. 509 indicates a print sheet size, a type of contents data, a print sheet number and whether the contents data can be recorded in a recording medium, and corresponds to the information described in the field 403 in FIG. 4. 510 is a mark for designating a user action in case of printing or reversing a printing for the print contents. Such user action will be explained later.

511 is an area for indicating status information relating to a connected printer (corresponding the printer 132 shown in FIG. 1). It is now displayed that the printer is in a printable state without an error, together with an estimated print completion time in the contents printing. In case that the power supply is not turned on or a trouble or an error such as a paper jamming or an ink exhaustion, a message of that effect is displayed in this area. The estimated print completion time is calculated and estimated by the CPU 118, based on the information described in the parameter description field 403 in FIG. 4 and performance information (print resolution information and print speed information) transmitted from the printer 132 connected to the receiver 100.

In the display shown in FIG. 5, the user can observe a schedule of the print contents (titles: print contents A, B, C to J, K, L) transmitted in channels 100 to 103 within a range of 19:00 to 23:00. FIG. 5 also indicates that the "print contents C" are selected by the selection cursor 503, and that the "print contents C" have a content "there are full of picture of sport players and idols" and the supplementary information of the print contents C indicates a printable time of 19:00 to 21:00, a print charge of 500 Yen, an A4 sheet size, a data type of photograph, a print sheet number of 15 sheets and a recording not permitted.

Now there will be explained a user action to the mark 510 shown in FIG. 5. In a position of the selection cursor shown in FIG. 5, the user can execute or reserve a printing of the print contents C by depressing the "red" button of the color keys 306 and the "1" key of the ten keys 305 in the remote control. For example, in case the current time is 19:30, the print contents C are transmitted in the channel 101, so that a printing is initiated. Also in case the current time is 18:30, the print contents C are still before the transmission start time, so that a printing is reserved. An example of a reserving image is shown in FIG. 6.

Figure 6:
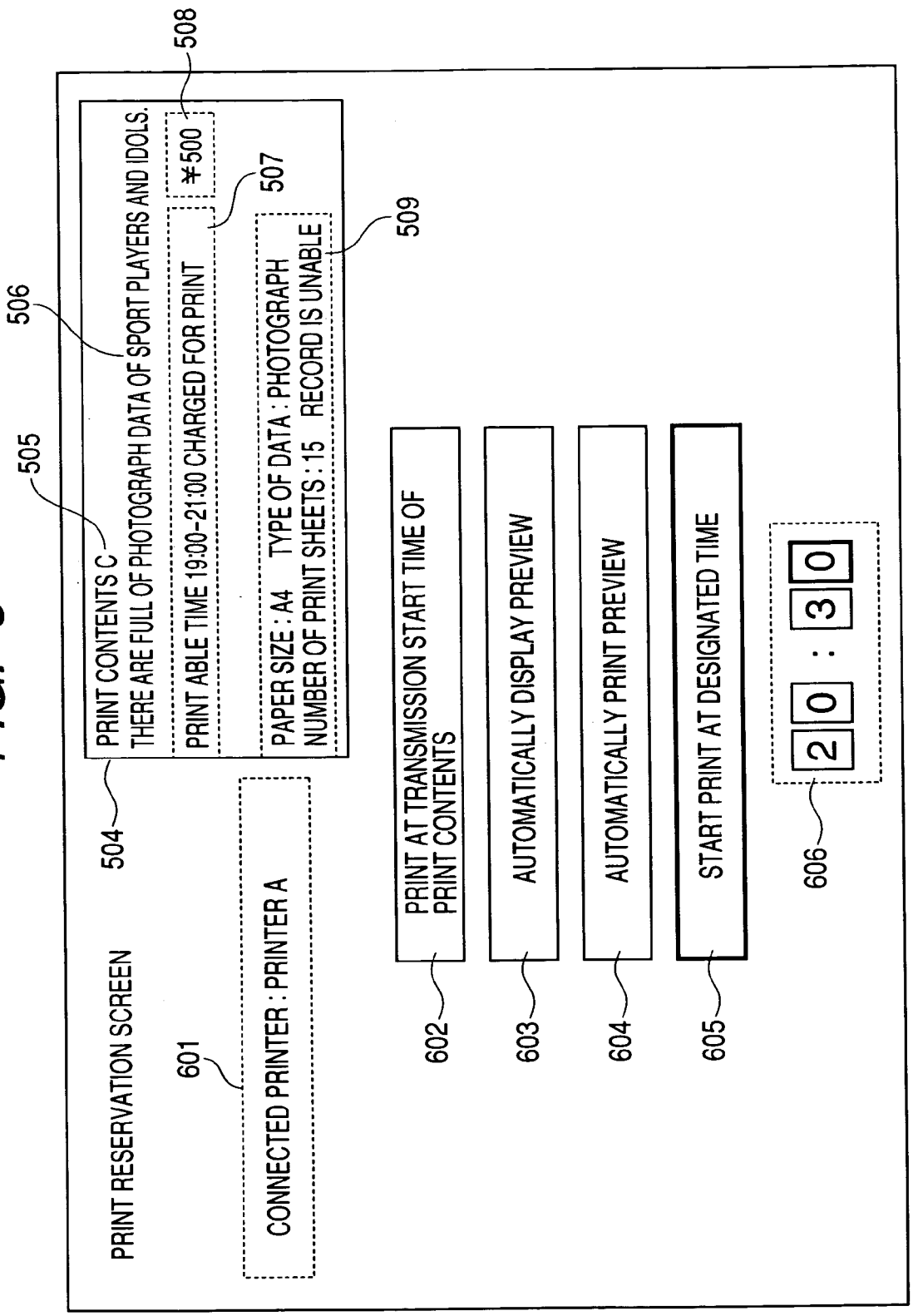
FIG. 6 is a view showing an example of an image for reserving printing.

Referring to FIG. 6, 601 indicates an area for displaying the type of the printer 132 connected to the receiver 100 (printer "A" in FIG. 6). 602, 603, 604 and 605 are items for designating when and how the print contents are printed by the user. In case the user selects 602, "print at the transmission start time of print contents", the printing of the print contents C is started at 19:00 which is the transmission start time thereof. In case the user selects 605, "start print at designated time", the print start time is designated by entering a desired time in a time input area 606 with the ten keys 305 of the remote control. Thus a printing is reserved. In case a print reservation time is set and a printing is reserved, information of the printer connected at such time is stored in the memory 107 through the CPU 108 and the bus 120.

Figure 7:
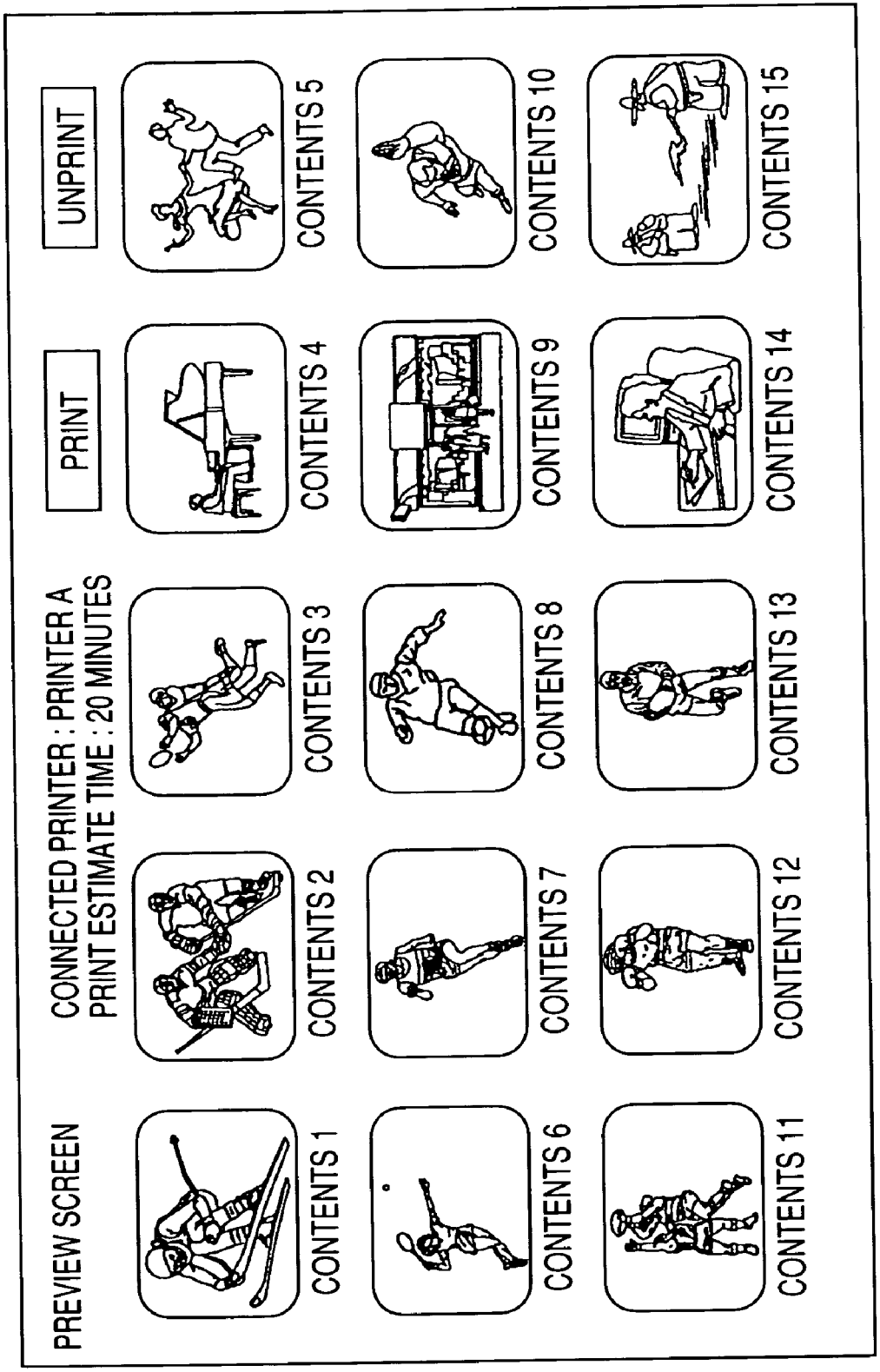
FIG. 7 is a view showing an example of a preview image for printing contents.

In case the user selects 603, "automatic preview display", contents preview data transmitted together with the print contents are displayed on the image display 112 at 19:00 which is the transmission start time of the print contents C. An example of such image is shown in FIG. 7. In a preview image as shown in FIG. 7, a thumbnail image reduced with a lower resolution is displayed for each print contents.

In case the user selects 604, "automatic preview print", contents preview data transmitted together with the print contents are printed, at 19:00 which is the transmission start time of the print contents C, by the printer 132.

In the image shown in FIG. 6, the print reservation is made assuming that the printer connected to the receiver 100 is the "printer A", but, in case the connected printer is changed before the start of printing, a warning is displayed on the image display 112. An example is shown in FIG. 8.

Figure 8:
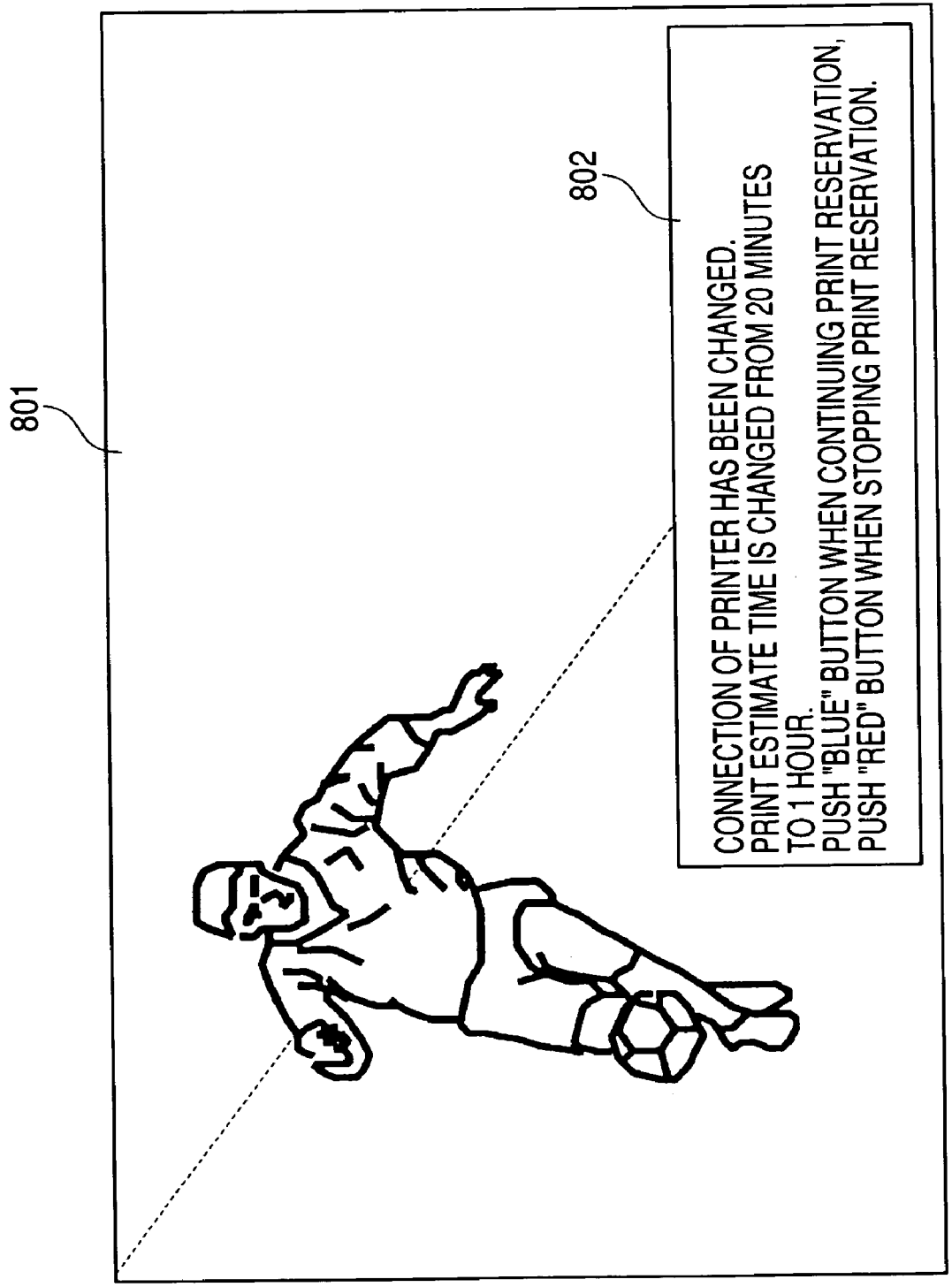
FIG. 8 is a view showing an example of a warning image when a printer connection is changed.

Referring to FIG. 8, 801 indicates a TV image viewed by the user after the printing reservation is made. 802 indicates an OSD display of a warning displayed when the printer connection is changed after the printing reservation. The CPU 118, upon detecting a change in the type of the printer through the 1394 I/F 122 and the bus 120, causes the image display 112 to display a warning as shown in FIG. 8, through the bus 120, the image construction unit 108 and the display controller 109. An example of the display shown in FIG. 8 informs the user of a fact that the estimate time to the printing completion is changed from 20 minutes to 1 hour by the change of the printer. The estimated print completion time is recalculated by the CPU 118, based on the information in the parameter description area 403 in FIG. 4 and the performance information (print resolution information and print speed information) transmitted from the newly connected printer. Upon observing such display, the user can instruct a continuation of the printing reservation to the CPU 118 by the "blue" button of the color keys 306 of the remote control 116 and a cancellation of the printing reservation to the CPU 118 by the "red" button of the color keys 306 of the remote control 116.

FIG. 9 shows an example of the PCG image when print contents F are selected by the selection cursor 503. As in FIG. 6, the area 504 displays the supplementary information of the print contents F, which are recordable as indicated by 909.

As the print contents F are recordable as indicated by 909, the user can execute printing, recording, print reservation and/or recording reservation in the illustrated state of the selection cursor, by depressing the "green" button of the color keys 306 and the "2" key of the ten keys 305 of the remote control 116. The contents data are recorded in the accumulating unit 119.

For example, in case the current time is 20:10, the print contents F are already transmitted at the channel 102 and can be printed or recorded. An example of the image displayed in such case is shown in FIG. 10.

In case the user selects 1001, "immediately print print contents", the printing of the print contents F is promptly started.

In case the user selects 1003, "preview display", a preview image of the print contents F corresponding to FIG. 7 is displayed.

In case the user selects 1004, "print preview", the preview image is printed.

In case the user selects 1006, "start print at designated time", the printing can be reserved by setting the print time by entering a desired time in a time input area 1007. In case the user sets a time other than the printable time of the print contents F in the time input area 1007, the print contents are recorded after the time setting in the area 1007 and the printing is started at the time entered in the time input area 1007.

In case the current time is 19:10, the print contents F are not yet transmitted at the channel 102 so that the printing, recording and display are all reserved. An example of the image displayed in such case is shown in FIG. 11.

In case the user selects 1101, "print at the transmission start time of print contents", the printing of the print contents F is started at 20:00 which is the transmission start time thereof.

In case the user selects 1102, "automatic preview display", a preview image of the print contents F corresponding to FIG. 7 is displayed at 20:00 which is the transmission start time thereof.

In case the user selects 1103, "automatic preview print", the preview image is printed at 20:00 which is the transmission start time thereof.

In case the user selects 1104, "record print contents", the printing reservation is not made and the contents data are recording in the accumulation unit 119 at 20:00 which is the transmission start time thereof.

In case the user selects 1105, "start print at designated time", the printing can be reserved by entering a desired time in a time input area 1105. In case the user sets a time other than the printable time of the print contents F, the print contents F are recorded at 20:00 which is the transmission start time thereof, and printed at the designated time.

Information of the print reservation time and the recording reservation time, and the information on the printer connected at the time of the print reservation are stored in the memory 107 through the CPU 118 and the bus 120, and, in case the connected printer is changed before the start of printing, the CPU 118 causes the image display 112 to display a warning corresponding to that shown in FIG. 8.

In case the printer status information 511 (FIG. 5) provides a display that the printing is not possible by a trouble such as a paper jamming or an ink exhaustion, the object data may be automatically recorded in the accumulation unit 119 at the printing operation, the recording operation, the print reservation operation or the recording reservation operation.

In the present embodiment, in the TS including picture data, speech data, data broadcast data and printable data, there are multiplexed information on the schedule of transmission of the print data, information of the type and the volume of the printable data. The TS receiver is provided with means which receives, decodes and displays the schedule information on the plural printable data and the supplementary information on the printable data, means which records and accumulates the recordable/accumulable print data, means which calculates the print time from the information of the connected printer and the supplementary information on the print data, and means which controls printing, recording of the printable data and reservation thereof from the list display of the schedule information and the supplementary information.

Such configuration provides following effects. Firstly, the user can understand when the printing data are transmitted and until when the data is printable.

Secondly, the user can understand the contents of the transmitted printing data.

Thirdly, the user can understand the type of the transmitted printing data.

Fourthly, the user can understand the volume in case of printing.

Fifthly, the user can understand whether the printing is charged or not in case of printing.

Sixthly, the user can understand the printing time required by the printer connected to the receiver.

Seventhly, the user can understand whether the transmitted data are accumulable.

Example 2

FIG. 12 shows an example of description in case supplementary information of print contents relating to a picture-speech program and a data broadcast is inserted as a descriptor of an EIT (event information table).

A parameter description field 1201 for the print contents describes an ID value given to each print contents, a transmission start time of the print contents, a transmission continuation time of the print contents, and a flag indicating whether the print contents are charged or not.

A parameter description field 1202 of the print contents describes information indicating an optimum sheet size (for example A3 or A4) for printing the print contents, information indicating information contained in the print contents (for example a photograph, a text and a pattern), a number of sheets in case of printing the print contents, a data capacity of the print contents, and a flag indicating whether the print contents 1 may be recorded in a recording medium in addition to a printing.

A parameter description field 1203 of the print contents describes a charge, in case the information in the field 1201 indicates that the contents are charged.

A parameter description field 1204 of the print contents describes text information representing a title of the print contents.

A parameter description field 1205 of the print contents describes text information describing the content of the print contents.

FIG. 13 shows an example of an EPG image, transmitted by an EIT describing information as shown in FIG. 12.

Referring to FIG. 13, 1301 indicates time information on a program schedule. 1302 indicates a channel number in which the program is broadcasted. A selection cursor 1303 can be moved by the cursor keys 303 of the remote control 116. 1304 is an area for displaying supplementary information on the program contents in the area selected by the selection cursor 503, indicating in this case a program title "Sports A", a program content "introducing fascination of various sports", a broadcast time of 19:00 to 21:00 and a charge of 500 Yen.

A hatched area 1305 indicates that print contents relating to the TV program "Sports A" are transmitted in such time zone. As in this time zone, print contents relating to the program are transmitted also for "Music 3" of channel 100, "Animation 3" of channel 102 and "Movie 2" of channel 103. A mark 1306 indicates a user action for printing or reserving a printing on the print contents relating to the program displayed in the area 1304.

Now there will be explained a user action to the mark 1306. In response to a depression of the P-button 308, there is displayed, according to the mark 1306, an image (print reservation image) for viewing the print contents supplementary information, printing the print contents, and reserving the printing of the print contents. An example of such display is shown in FIG. 14.

Figure 14:
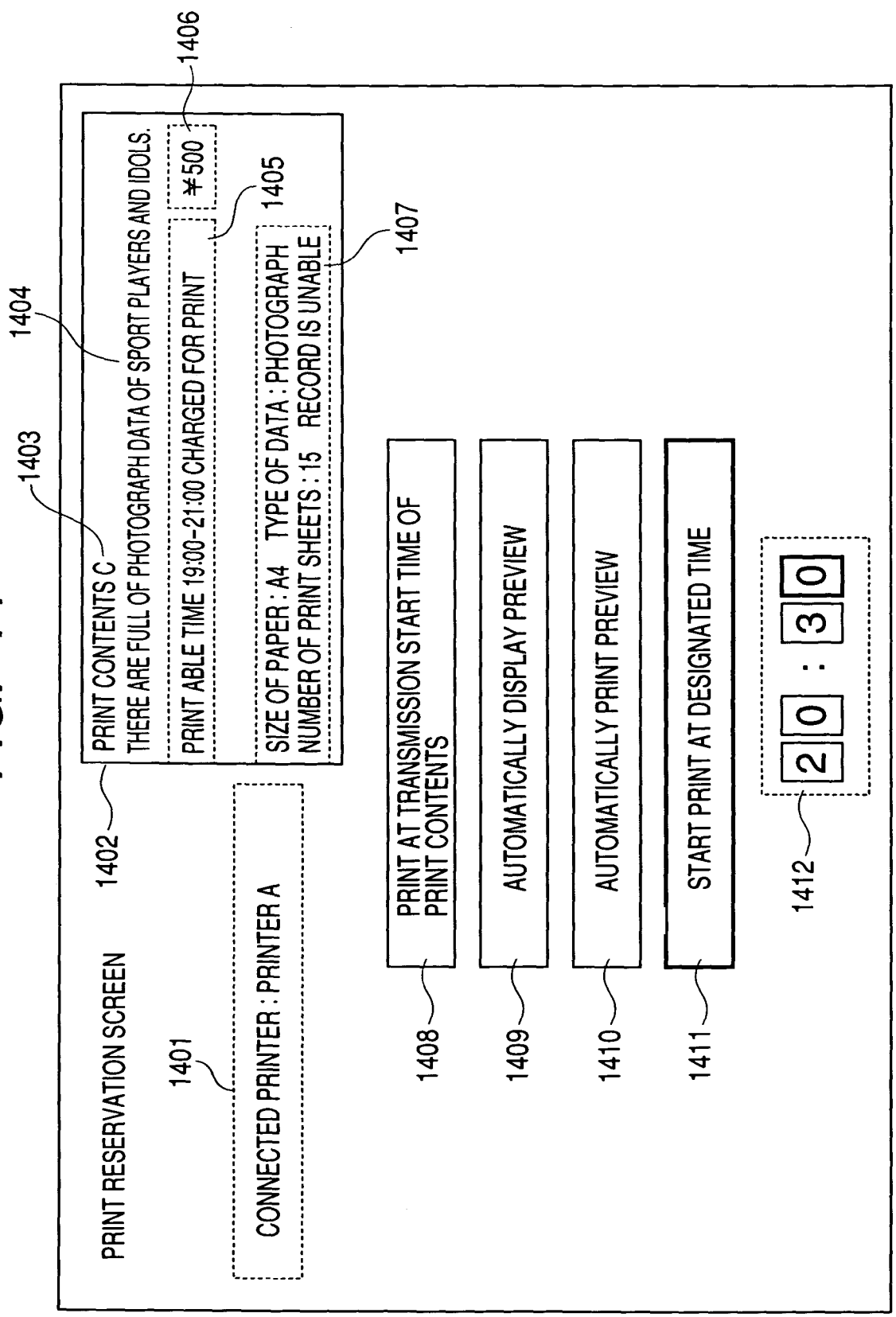
FIG. 14 is a view showing an example of an image for reserving printing.

An area 1401 displays the type of the printer 132 currently connected to the receiver 100 ("printer A" in FIG. 14). An area 1402 displays the supplementary information of the print contents relating to the program selected by the selection cursor 1303. An area 1403 displays the title of the print contents relating to the program selected by the selection cursor 1303, and displays information corresponding to the text information described in the field 1204 in FIG. 12.

An area 1404 indicates the content of the print contents relating to the program selected by the selection cursor 1303, and displays information corresponding to the text information described in the field 1205 in FIG. 12.

An area 1405 indicates a printable time of the print contents relating to the program selected by the selection cursor 1303 and whether the print contents are charged or not in case of printing, and displays information corresponding to the information described in the field 1201 in FIG. 12.

An area 1406 displays a charge in case of printing, namely information described in the field 1203 in FIG. 12.

An area 1407 indicates a print sheet size, a type of contents data, a print sheet number and whether the contents data can be recorded in a recording medium, and shows information corresponding to the information described in the field 1202 in FIG. 12.

Areas 1408, 1409, 1410 and 1411 are used by the user when and how to print the print contents. Such selection and function are similar to those in the first embodiment and will not be explained further.

A recording/accumulating function for the recordable/accumulable print data, a function of calculating the print time from the information of the connected printer and the supplementary information on the print data, a function of controlling printing, recording of the printable data and reservation thereof from the list display of the schedule information and the supplementary information, a function of displaying the alarm in case the printer connection is changed after the print reservation or the recording reservation, and a function of selecting whether or not to continue the reservation in response to the warning, are similar to those in the first embodiment and will not be explained further.

In the present embodiment, in the EPG data of TS, there are multiplexed information on the schedule of transmission of the print data, information of the type and the volume of the printable data. The TS receiver is provided with means which receives, decodes and displays the schedule information on the plural printable data and the supplementary information on the printable data, means which records and accumulates the recordable/accumulable print data, means which calculates the print time from the information of the connected printer and the supplementary information on the print data, and means which controls printing, recording of the printable data and reservation thereof from the list display of the schedule information and the supplementary information, whereby the supplementary information on the print contents relating to the program is displayed in the EPG image.

Such configuration resolves the aforementioned drawbacks and enables a highly convenient printing operation for the user. Also, the contents data which can be outputted to the peripheral equipment can be, in addition to print contents data, music contents data or a game program, and the peripheral equipment can be, in addition to a printer, a music reproducing apparatus or a reproducing memory apparatus.

This application claims priority from Japanese Patent Application No. 2003-361746 filed Oct. 22, 2003, which is hereby incorporated by reference herein.

What is claimed is:

1. A TV apparatus connectable to a printer, said TV apparatus comprising:
   a tuner unit that receives a broadcast signal including electronic program guide (EPG) data, printable contents data, and supplementary information data relating to the printable contents data;
   a control unit that generates print contents guide (PCG) data according to the supplementary information data; and
   a display control unit that controls a display device to selectively display an EPG image based on the EPG data and a PCG image based on the PCG data, the EPG image comprising a program broadcasting schedule,
   wherein the PCG image has cells disposed in an area defined by a time-axis and a channel-axis at positions corresponding to channels and broadcast times, and the PCG image displays printable contents information indicating in each cell whether or not printable contents are broadcasted, on the basis of the supplementary information data,
   wherein the printable contents information is a content title of printable contents if the printable contents are broadcasted, while the printable contents information is a message indicating the absence of printable contents if the printable contents are not broadcasted.

2. A TV apparatus according to claim 1, wherein the display control unit controls the display device to display a preview image of the printable contents selected by the user on the PCG image, and
   wherein the preview image comprises a plurality of thumbnail images based on image data obtained from the printable contents data.

3. A TV apparatus according to claim 1, wherein the supplementary information includes content details, printable time period, and print fee information of the selected printable contents.

4. A method for processing data in a TV apparatus, the method comprising the steps of:
   receiving a broadcast signal including electronic program guide (EPG) data, printable contents data, and supplementary information data relating to the printable contents data;
   generating print contents guide (PCG) data according to the supplementary information data; and
   controlling a display device to selectively display an EPG image based on the EPG data and a PCG image based on the PCG data, the EPG image comprising a program broadcasting schedule,
   wherein the PCG image has cells disposed in an area defined by a time-axis and a channel-axis at positions corresponding to channels and broadcast times, and the PCG image displays printable contents information in each cell indicating whether or not printable contents are broadcasted, on the basis of the supplementary information data,
   wherein the printable contents information is a content title of printable contents if the printable contents are broadcasted, while the printable contents information is a message indicating the absence of printable contents if the printable contents are not broadcasted.

* * * * *